United States Patent
Ooi et al.

(10) Patent No.: US 7,715,145 B2
(45) Date of Patent: May 11, 2010

(54) VARIABLE SPINDLE SPEED FOR RAMP UNLOAD

(75) Inventors: KianKeong Ooi, Singapore (SG); ShuangQuan Min, Singapore (SG); KianSoon Yeo, Singapore (SG); WeiSoon Lee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/211,131

(22) Filed: Sep. 16, 2008

(65) Prior Publication Data

US 2010/0067138 A1 Mar. 18, 2010

(51) Int. Cl.
*G11B 21/02* (2006.01)
*G11B 15/46* (2006.01)

(52) U.S. Cl. ..................... 360/75; 360/73.03
(58) Field of Classification Search ............... None
See application file for complete search history.

(56) References Cited

U.S. PATENT DOCUMENTS

| | | | |
|---|---|---|---|
| 4,933,785 A | 6/1990 | Morehouse et al. | 360/78.04 |
| 5,187,627 A | 2/1993 | Hickox et al. | 360/105 |
| 5,324,004 A | 6/1994 | Richardson | 254/88 |
| 5,455,723 A | 10/1995 | Boutaghou et al. | 360/75 |
| 5,764,430 A | 6/1998 | Otteson et al. | 360/73.03 |
| 5,936,788 A | 8/1999 | Boutaghou et al. | 360/75 |
| 6,134,071 A | 10/2000 | Andoh et al. | 360/75 |
| 6,134,076 A | 10/2000 | Boutaghou et al. | 360/105 |
| 6,236,527 B1 * | 5/2001 | Uchiike et al. | 360/75 |
| 6,680,811 B2 | 1/2004 | Gillis et al. | 360/75 |
| 6,693,761 B2 | 2/2004 | Ishii et al. | 360/75 |
| 6,710,964 B1 | 3/2004 | Rao et al. | 360/75 |
| 6,717,773 B2 | 4/2004 | Hawwa et al. | 360/254.7 |
| 6,920,007 B2 | 7/2005 | Tominaga et al. | 360/75 |
| 7,057,855 B2 | 6/2006 | Ueno et al. | 360/235.7 |
| 7,064,919 B2 | 6/2006 | Inaji et al. | 360/78.06 |
| 7,236,331 B2 | 6/2007 | Ramsdell | 360/254.8 |
| 2001/0022701 A1 | 9/2001 | Ishii et al. | 360/73.03 |
| 2002/0027740 A1 | 3/2002 | Inaji et al. | 360/78.06 |
| 2002/0126418 A1 | 9/2002 | Ueno et al. | 360/235.07 |
| 2003/0067706 A1 | 4/2003 | Gillis et al. | 360/75 |
| 2003/0081343 A1 | 5/2003 | Tominaga et al. | 360/75 |
| 2004/0190203 A1 | 9/2004 | Albrecht et al. | 360/246.1 |
| 2005/0122626 A1 | 6/2005 | Suzuki | 360/244.9 |
| 2006/0092550 A1 | 5/2006 | Ishii et al. | 360/75 |
| 2007/0103809 A1 * | 5/2007 | Lee et al. | 360/75 |
| 2008/0019034 A1 | 1/2008 | Ohtsu | 360/75 |

* cited by examiner

*Primary Examiner*—Andrew L Sniezek
(74) *Attorney, Agent, or Firm*—Westman, Champlin & Kelly, P.A.

(57) ABSTRACT

In a particular embodiment, a controller is adapted to control a spindle motor that controls rotation of at least one rotatable disc of a storage device. The controller is adapted to increase a spindle speed associated with the spindle motor to an unload spindle speed that is greater than an operating spindle speed during a ramp unload operation.

20 Claims, 14 Drawing Sheets

1800

| Devices | Without High RPM Unload (mA) | With High RPM Unload (mA) | Difference (mA) |
|---|---|---|---|
| 1 | 110.1 | 100.0 | 10.1 |
| 2 | 118.8 | 111.5 | 7.3 |
| 3 | 107.9 | 99.8 | 8.1 |
| 4 | 109.5 | 106.7 | 2.8 |
| 5 | 91.0 | 87.2 | 3.8 |
| 6 | 110.8 | 104.7 | 6.1 |
| 7 | 107.1 | 101.2 | 5.9 |
| 8 | 134.7 | 118.9 | 15.8 |
| 9 | 112.2 | 108.1 | 4.1 |
| 10 | 99.8 | 97.4 | 2.4 |
| 11 | 117.1 | 109.7 | 7.4 |
| 12 | 116.0 | 103.7 | 12.3 |
| 13 | 98.9 | 94.5 | 4.4 |
| 14 | 108.7 | 101.6 | 7.1 |
| 15 | 132.9 | 121.3 | 11.6 |
| 16 | 107.4 | 104.7 | 1.7 |
| 17 | 125.5 | 111.0 | 14.5 |
| 18 | 122.6 | 110.7 | 11.9 |
| 19 | 128.3 | 123.4 | 4.9 |
| Overall Mean | 113.6 | 106.2 | 7.5 |
| Overall Std. Deviation | 11.5 | 9.1 | 4.2 |

FIG. 18

VARIABLE SPINDLE SPEED FOR RAMP UNLOAD

FIELD

The present embodiments relate generally to a variable spindle speed for ramp unload, and more particularly but not by limitation to a storage device having a variable spindle speed for ramp unload of a head mounted to a slider.

BACKGROUND

For a storage device with a ramp load/unload mechanism, one challenge includes issues related to low fly heights during load/unload, which can cause spindle speed dips while the slider is flying over a data zone, unload peak voice coil motor (VCM) current spikes due to a large drag force during unload, head/media contact, and damage to the media or the read/write head due to such contact. In small form factor storage devices, the ramp load/unload mechanism is moved to an extreme outside diameter of the storage media to maximize the disc real estate. However, the airflow at the outside diameter is less stable relative to the airflow toward the center of the storage media. Further, in small form factor storage devices, spindle speed dip and head/media contact tend to occur more frequently during unload operations due to a dwelling time at ramp contact during ramp unload operation.

Embodiments of the present invention provide solutions to these and other problems, and offer other advantages over the prior art.

SUMMARY

In a particular embodiment, a controller is adapted to control a spindle motor that controls rotation of at least one rotatable disc of a storage device. The controller is adapted to increase a spindle speed associated with the spindle motor to an unload spindle speed that is greater than an operating spindle speed during a ramp unload operation.

In another particular embodiment, a storage device is disclosed that includes at least one rotatable disc adapted to store data and a spindle motor coupled to a spindle adapted to rotate the at least one rotatable disc at variable speeds. The storage device further includes an actuator assembly including an actuator arm adapted to pivot relative to the at least one rotatable disc. The actuator assembly includes a read/write head for reading and writing data from and to the at least one rotatable disc. The storage device also includes a load/unload ramp mechanism positioned adjacent to the at least one rotatable disc and adapted to receive the actuator arm in an unloaded position. Further, the storage device includes a controller adapted to control the spindle motor to increase a spindle speed associated with the spindle to an unload spindle speed during a ramp unload operation.

In still another particular embodiment, a method is disclosed that includes increasing a spindle speed of a spindle coupled to at least one rotatable disc of a storage device to an unload spindle speed during a ramp unload operation. The ramp unload operation parks an actuator assembly including an actuator arm having a read/write head at a ramp mechanism positioned adjacent to the at least one rotatable disc. The method further includes controlling the actuator arm to prevent contact between the actuator assembly and the ramp mechanism until the spindle speed reaches the unload spindle speed.

Other features and benefits that characterize embodiments disclosed herein will be apparent upon reading the following detailed description and review of the associated drawings.

BRIEF DESCRIPTION OF THE DRAWINGS

FIG. 18 is a particular illustrative embodiment of a table comparing unload peak VCM currents during ramp unload operations for particular storage devices operating with and without a relatively high spindle speed during ramp unload operation.

The above-identified figures are intended to be illustrative only and are included only to facilitate the following description. Other features and benefits that characterize embodiments disclosed herein will be apparent upon reading the following detailed description and review of the associated drawings.

DETAILED DESCRIPTION OF ILLUSTRATIVE EMBODIMENTS

Figure 1:
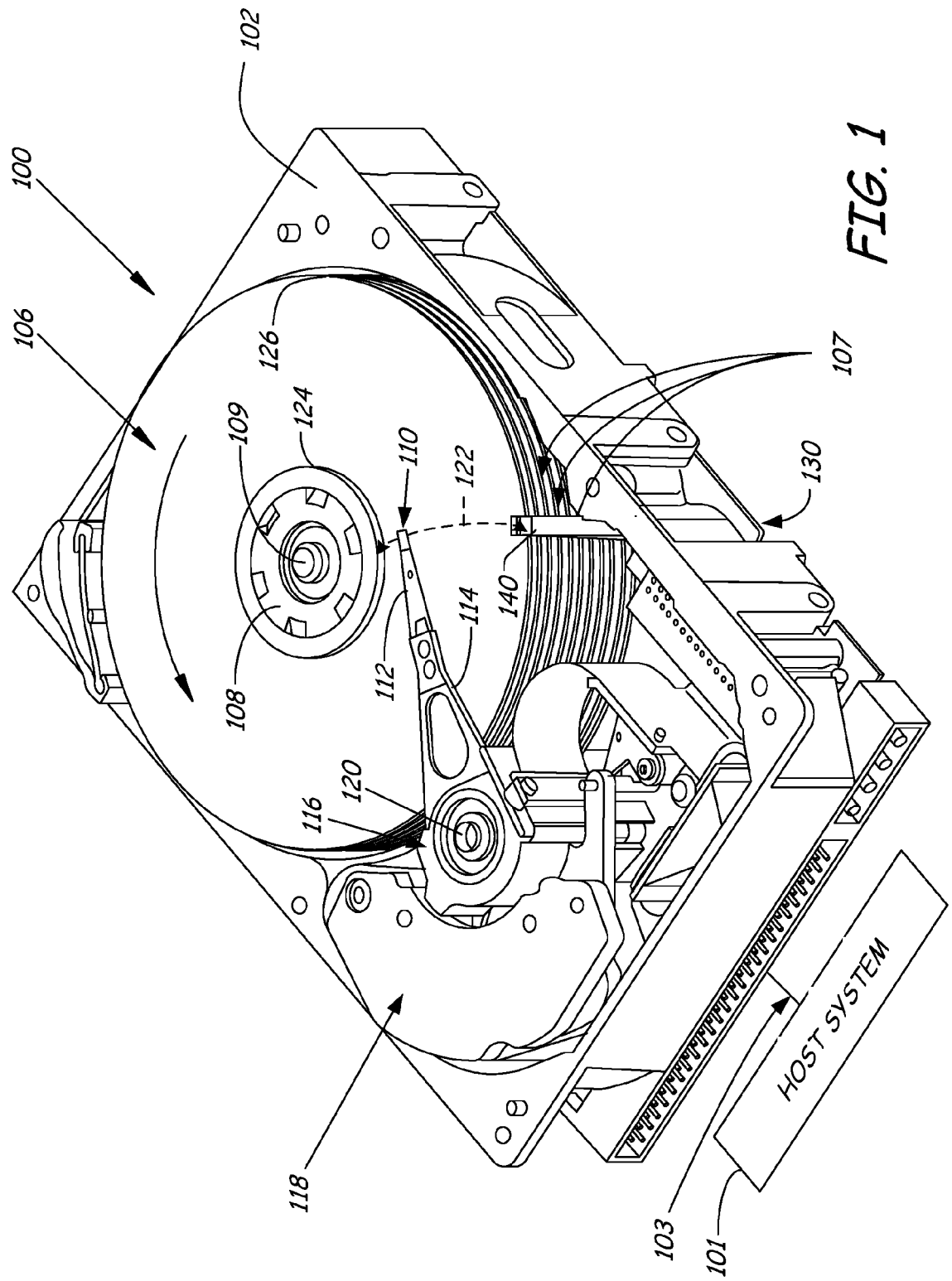
FIG. 1 is an isometric view of a particular illustrative embodiment of a disc drive including logic to control a variable spindle speed for ramp unload operations.

FIG. 1 is an isometric view of a disc drive 100 including a ramp load/unload mechanism 140 and logic to vary a spindle speed during ramp unload operations. The disc drive 100 includes a housing with a base 102 and a top cover (not shown). Disc drive 100 further includes a disc pack 106, which is mounted on a spindle (such as the spindle 257 illustrated in FIG. 2) by a disc clamp 108. The spindle is coupled to a spindle motor (such as the spindle motor 258 illustrated in FIG. 2). The disc pack 106 includes a plurality of individual discs, which are mounted for co-rotation about central axis 109. Each disc surface is associated with a disc head slider 110, which bears a read/write head that is mounted to disc drive 100 for communication with the disc surface. In the example shown in FIG. 1, the disc head sliders 110 are supported by suspensions 112, which are in turn attached to track accessing arms 114 of an actuator 116.

The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along a path 122 between a disc inner diameter 124 and a disc outer diameter 126. The voice coil motor 118 is driven by servo electronics 130 disposed along the base of the disc drive 100. In general, the voice coil motor 118 is driven by the servo electronics 130 based on signals generated by the heads 110 and by a host computer, such as the host 101, which can communicate with the disc drive 100 via an interface 103. In a particular example, the voice coil motor 118 is adapted to rotate the actuator 116 to position the track accessing arms 114 and the suspensions 112 over the disc pack 106 and to move the track accessing arms 114 so that the read/write heads 110 contact the ramp load/unload mechanism 140 when the disc drive 100 is shut down (when the read/write heads 110 are parked).

In a particular embodiment, the servo electronics 130 include control circuitry (such as a controller) that is adapted to control a spindle motor (such as the spindle motor 258 illustrated in FIG. 2) that controls rotation of one or more rotatable discs (of the disc pack 106) of the storage device 100, which includes a ramp mechanism 140 at an outside diameter 126 of the one or more rotatable discs 106. The control circuitry of the servo electronics 130 is adapted to increase a spindle speed associated with the spindle motor to an unload spindle speed that is greater than an operating spindle speed during a ramp unload operation. The term "spindle speed" is used herein to refer to a rotational velocity associated with a spindle (such as the spindle 257 illustrated in FIG. 2) that is coupled to a rotatable storage media, such as a disc pack 106, and that is controlled by a spindle motor, such as the spindle motor 258 illustrated in FIG. 2. In general, the rotational velocity or spindle speed of the spindle is related to an associated rotational velocity of the one or more rotatable discs (or disc pack) 106. In a particular embodiment, the control circuitry of the servo electronics 130 is adapted to control an actuator assembly, including the voice coil motor 118, the actuator 116, the track accessing arms 114, the suspensions 112, and the associated read/write heads 110, to delay contact between the read/write heads 110 (or the suspensions 112) and the ramp mechanism 140 until the spindle speed reaches the unload spindle speed.

In another particular embodiment, a storage device 100 includes the disc pack 106 having one or more rotatable discs that are adapted to store data. The storage device 100 also includes a spindle motor (such as the spindle motor 258 illustrated in FIG. 2) that is adapted to rotate the one or more rotatable discs of the disc pack 106 at variable speeds. An actuator assembly including track accessing arms 114 is adapted to pivot relative to the one or more rotatable discs of the disc pack 106. The track accessing arms 114 include read/write heads 110 for reading and writing data from and to the one or more rotatable discs of the disc pack 106. The storage device 100 further includes a load/unload ramp mechanism 140 positioned adjacent to an outer circumferential edge (outer diameter 126) of the one or more rotatable discs of the disc pack 106 and is adapted to receive the track accessing arms 114 in an unloaded position. The storage device 100 also includes the servo electronics 130 including a controller adapted to control the spindle motor to increase the rotational velocity of the one or more rotatable discs of the disc pack 106 by increasing the spindle speed to an unload spindle speed during a ramp unload operation. The controller of the servo electronics 130 is adapted to control movement of the track accessing arms 114 to prevent contact between the read/write heads 110 and the load/unload ramp mechanism 140 until the spindle speed reaches the unload spindle speed.

In a particular example, the control circuitry of the servo electronics 130 is also adapted to position the track accessing arms 114 so that the associated read/write heads 110 are positioned relative to a storage track of the one or more discs of the disc pack 106 until the spindle speed reaches the unload spindle speed. Once the unload spindle speed is reached, the control circuitry of the servo electronics 130 is adapted to move the track accessing arms 114 to the outer diameter 126 of the disc pack 106 and to park the read/write heads 110 in contact with the load/unload ramp mechanism 140.

In a particular embodiment, the unload spindle speed and the associated rotational velocity of the one or more discs of the disc pack 106 is greater than an operating rotational velocity of the one or more discs. In a particular example, the increased rotational velocity of the disc pack 106 improves air flow at the extreme outer diameter 126 of the disc pack 106, improving fly-ability of the read/write head 110 bearing slider at the extreme outer diameter 126. The control circuitry of the servo electronics 130 can also introduce a delay to enable the spindle and the disc pack 106 to reach the relatively high unload speed before the read/write head 110 is moved to the ramp contact. Further, the read/write head 110 may be positioned relative to a predetermined track as the spindle speed is increased to make the head moving time constant during the unload operation. In a particular example, the predetermined track may be located at a middle track of the one or more discs 106 or at a track located toward the inner diameter 124 of the one or more discs 106. It should be understood that the read/write head 110 is typically mounted to a slider that is designed to fly over a surface of the one or more discs using airflow from rotation of the one or more discs to maintain a controlled fly height. In general, the slider may be designed to contact the load/unload ramp mechanism 140, rather than allowing direct contact between the ramp 140 and the read/write head 110. In an alternative embodiment, the suspension 112 may contact the load/unload ramp mechanism 140, rather than allowing direct contact between the ramp 140 and either the read/write head or the head-bearing slider.

Some of the advantages realized using the increased unload spindle speed and the associated increased unload rotational velocity of the one or more discs 106 includes the reduction of spindle speed dip during ramp unload operation, reduction of the peak unload VCM current and reduction in particle, media and read/write head damage. Another particular advantage is provided in that the aerodynamics of the slider in low-profile storage devices can be simplified since the airflow dynamics at the extreme outer diameter 126 of the disc pack 106 is improved via the increased spindle velocity.

Figure 2:
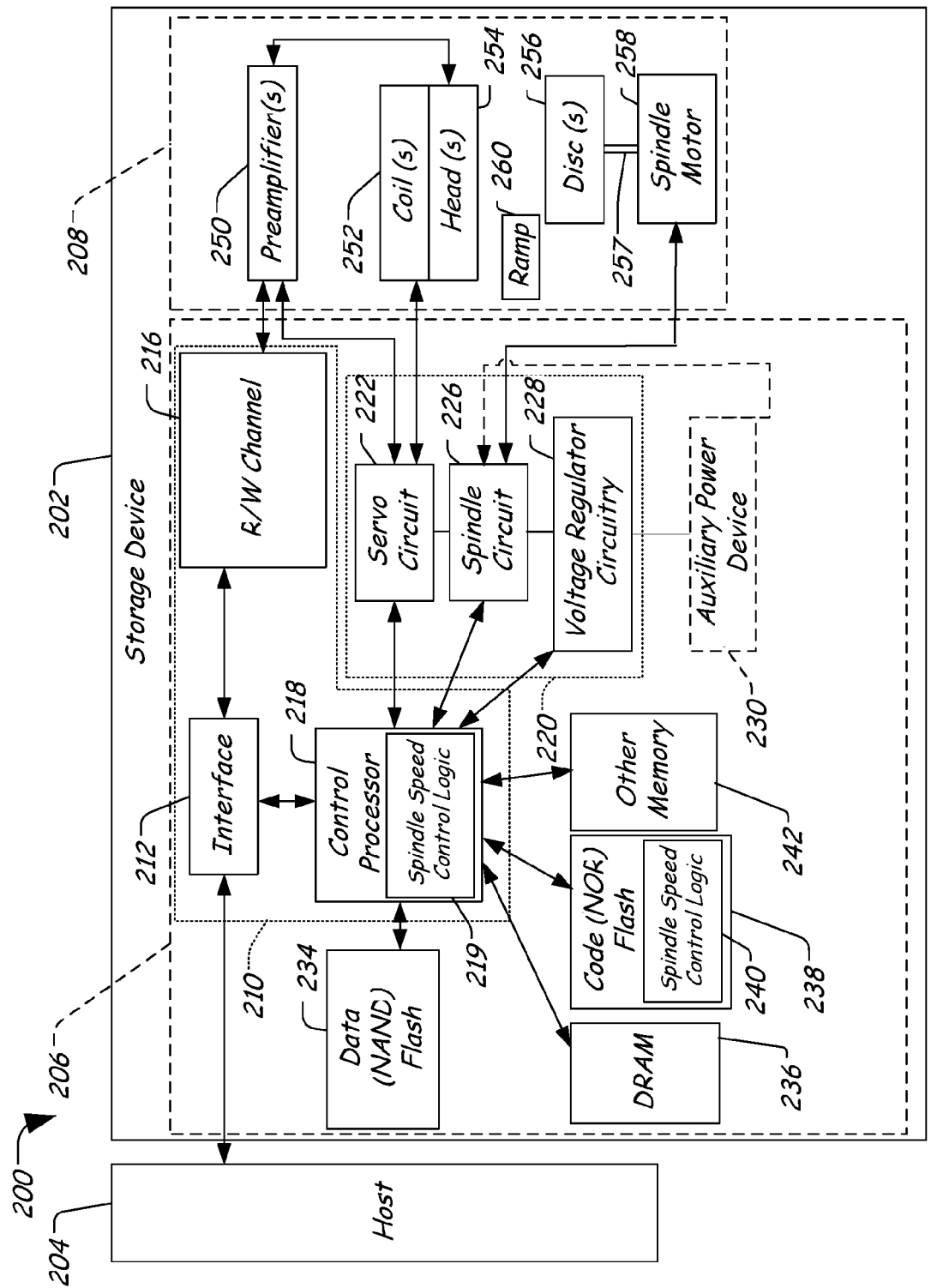
FIG. 2 is a block diagram of a particular illustrative embodiment of a system including a hybrid storage device adapted to control a variable spindle speed for ramp unload operations.

FIG. 2 is a block diagram of a particular illustrative embodiment of a system 200 including a hybrid storage device 202 adapted to provide a variable spindle speed for ramp unload. As used herein, the term "hybrid storage device" refers to a data storage device that includes both rotating storage media and solid-state storage media. The hybrid storage device 202 is adapted to communicate with a host system 204. In a particular embodiment, the host system 204 can be a computer, a processor, a personal digital assistant (PDA), another electronic device, or any combination thereof.

The hybrid storage device 202 includes recording subsystem circuitry 206 and a head-disc assembly 208. The recording subsystem 206 includes storage device read/write control circuitry 210 and disc-head assembly control circuitry 220. The recording subsystem circuitry 206 includes an interface circuit 212, which includes a data buffer for temporarily buffering the data and a sequencer for directing the operation of the read/write channel 216 and the preamplifier 250 during data transfer operations. The interface circuit 212 is coupled to the host system 204 and to a control processor 218, which is adapted to control operation of the hybrid storage device 202. In a particular embodiment, the control processor 218 includes spindle speed control logic 219 that is adapted to control a spindle circuit 226 and a spindle motor 258 to increase a rotational velocity associated with one or more rotatable discs 256, for example, during a ramp unload operation where the one or more read/write heads 254 are moved to contact a load/unload ramp mechanism 260. In a particular example, the ramp unload operation is performed to park the one or more read/write heads 254, for example, when the storage device is powered down. In a particular embodiment, the spindle speed control logic 219 can be processor executable instructions that are executed by the control processor 218.

The control processor 218 is coupled to a servo circuit 222 that is adapted to control the position of the one or more read/write heads 254 relative to the one or more discs 256 as part of a servo loop established by the one or more read/write heads 254. Generally, the one or more read/write heads 254 are mounted to a rotary actuator assembly to which a coil 252 of a voice coil motor (VCM) is attached. As is known in the art, a VCM includes a pair of magnetic flux paths between which the coil 252 is disposed so that the passage of current through the coil causes magnetic interaction between the coil 252 and the magnetic flux paths, resulting in the controlled rotation of the actuator assembly and the movement of the one or more read/write heads 254 relative to the surfaces of the one or more rotatable discs 256. The servo circuit 222 is used to control the application of current to the coil 252, and hence the position of the one or more read/write heads 254 with respect to the tracks of the one or more rotatable discs 256.

In general, the disc-head assembly control circuitry 220 includes the servo circuit 222 and includes the spindle circuit 226 that is coupled to the spindle motor 258 to control the rotation of the one or more discs 256. The disc-head assembly control circuitry 220 further includes voltage regulator circuitry 228 that controls a power supply to the spindle motor 258 via the spindle circuit 226. The hybrid storage device 202 also includes an auxiliary power device 230 that is coupled to the disc-head assembly control circuitry 220 and that is adapted to operate as a power source when power to the hybrid storage device 202 is lost. In a particular embodiment, the auxiliary power device 230 can be a capacitor or a battery that is adapted to supply power to the hybrid storage device 202 under certain operating conditions. In a particular example, the auxiliary power device 230 can provide a power supply to the recording subsystem assembly 206 and to the disc-head assembly 208 to record data to the one or more rotatable discs 256 when power is turned off. In a particular embodiment, the auxiliary power device 230 is adapted to supply power to the spindle motor 258 via the spindle circuit 226 to increase the spindle speed if power is lost during an unload operation. Further, the auxiliary power device 230 may supply power to the recording subsystem assembly 206 to record data to a data (NAND) flash 234 or to a code (NOR) flash 238 when power is turned off.

Additionally, the hybrid storage device 202 includes the data (NAND) flash 234, a dynamic random access memory (DRAM) 236, the code (NOR) flash 238, other memory 242, or any combination thereof. In a particular embodiment, the code (NOR) flash 238 stores spindle speed control logic instructions 240, which can be loaded and executed by the control processor 218, for example, in response to receiving a spin down command via the interface 212.

In a particular embodiment, the storage device 202 includes one or more rotatable discs 256 that are adapted to store data and includes a spindle motor 258 adapted to rotate the one or more rotatable discs 256 at variable speeds via a spindle 257. The storage device 202 also includes disc-head assembly control circuitry 220, which includes the one or more coils 252 and read/write heads 254 coupled to an actuator assembly including an actuator arm adapted to pivot relative to the one or more rotatable discs 256 (such as the track accessing arms 114 and the suspension 112 illustrated in FIG. 1). The actuator arm including a read/write head 254 for reading and writing data from and to the one or more rotatable discs 256. The storage device 202 also includes a load/unload ramp mechanism 260 positioned adjacent to the one or more rotatable discs 256 and adapted to receive the actuator arm in an unloaded position. The storage device 202 further includes a control processor 218 (sometimes referred to as a controller), which is adapted to control the spindle motor 258 via the spindle circuit 226 and the voltage regulator circuitry 228 to increase a spindle speed associated with the spindle 257 and an associated rotational velocity of the one or more rotatable discs 256 to an unload spindle speed and an associated unload rotational velocity during a ramp unload operation. The control processor 218 is adapted to control movement of the actuator arm (via the coils 252) to prevent contact between the read/write heads 254 and the load/unload ramp mechanism 260 until the rotational speed of the spindle 257 reaches the unload spindle speed. Once the read/write heads 254 are parked at the ramp mechanism 260, the storage device 202 can be powered down.

In a particular embodiment, the load/unload ramp 260 includes a sloped portion that has a positive slope that increases in a direction extending away from the storage media. The load/unload ramp 260 may also include a top ramp portion that has no slope, and a ramp detent portion that is indented relative to the top ramp portion to receive and secure the read/write head or the actuator arm assembly when ramp unload operation is complete. In a particular embodiment, the control processor 218 is adapted to turn off the spindle motor 258 after the actuator arm is secured.

In a particular illustrative embodiment, the code (NOR) flash 238 is a solid-state memory that stores operating instructions (including spindle speed control logic instructions 240) that are executable by the control processor 218 to control the variable speeds via the spindle circuit 226 and the spindle motor 258 and to control operation of the actuator assembly, including the servo circuit 222, the coils 252 and the read/write heads 254. In a particular embodiment, the control processor 218 controls the servo circuitry 222 to position the one or more read/write heads 254 at a particular storage track of the one or more rotatable discs 256 until the rotational velocity of the spindle 257 reaches the unload spindle speed. In a particular embodiment, the auxiliary power source 230 is coupled to the spindle control circuit 226 and is adapted to provide operating power to the spindle motor 258 to increase the spindle speed of the spindle 257 to the unload spindle speed when power is lost.

In another particular embodiment, the storage device 202 also includes the interface 212 that is responsive to the host system 204 and that is coupled to the control processor 218. The control processor 218 is responsive to a command (such as a "spin down" command) received via the interface 212 to initiate the unload operation. In a particular example, the host system 204 may be adapted to enter a reduced power mode, such as an idle, sleep, or standby mode. In a particular example, the host system 204 may send a "spin down" command to the interface 212 of the storage device 202, such as via a data bus or other data interface. The spin down command may be provided to the control processor 218, which is adapted to execute the spindle speed control logic 219 to increase a rotational velocity of the one or more discs 256 before the read/write heads 254 are moved to contact the load/unload ramp mechanism 260.

Figure 3:
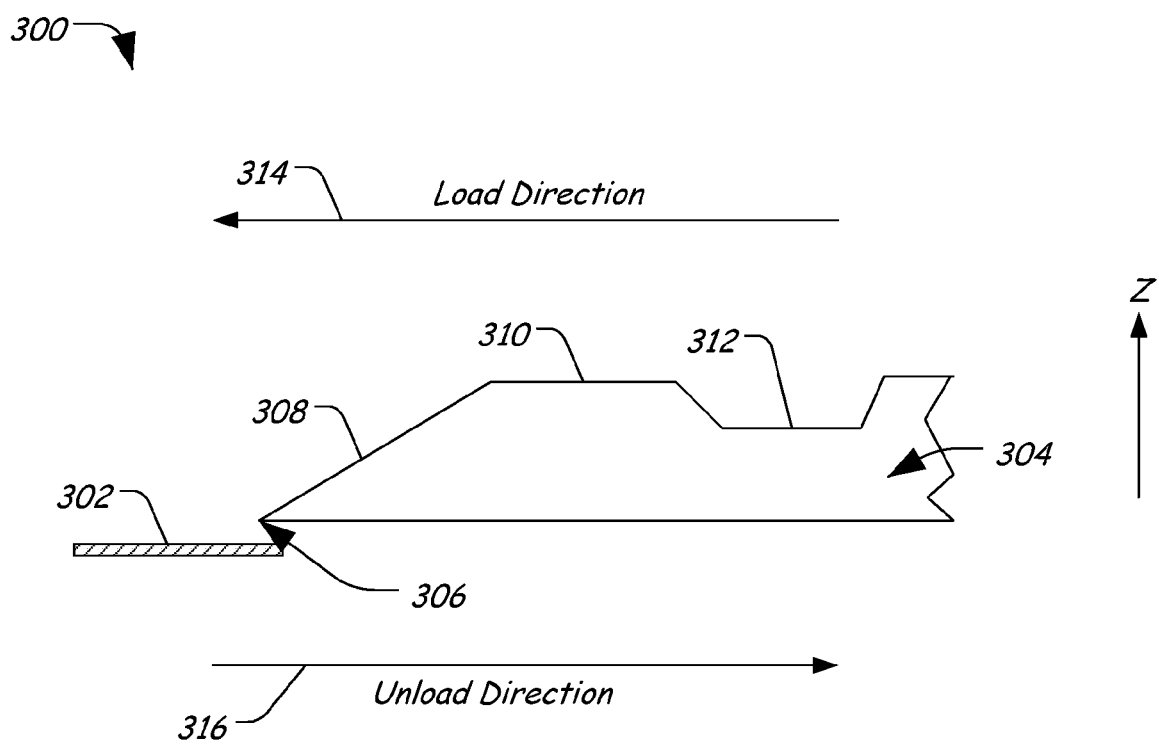
FIG. 3 is a diagram of a particular illustrative embodiment of a system including a storage medium and an associated ramp for load/unload of a read/write head bearing slider.

FIG. 3 is a diagram of a particular illustrative embodiment of a system 300 (not to scale) including a storage medium 302 and an associated ramp mechanism 304 for load/unload of a read/write head bearing slider. The ramp mechanism 304 includes a ramp tip 306 that extends at least partially over the storage medium 302. In the illustrative embodiment of FIG. 3, the ramp mechanism 304 is depicted adjacent to the outer edge of the storage medium (disc) 302, but the claimed embodiments are not so limited. The ramp mechanism 304 also includes a slope portion 308 that has a positive slope extending from the ramp tip 306 to a ramp top portion 310, which has approximately a zero slope (i.e., the ramp top portion is substantially parallel to the storage medium 302). Further, the ramp mechanism 304 includes a detent portion 312, which is an indented portion relative to the ramp top portion 310. In a particular embodiment, a read/write head or an actuator arm portion may be positioned within the detent portion 312 of the ramp mechanism 304 to secure the read/write head or actuator arm portion. It should be understood that the system 300 is not drawn to scale, and is provided for illustrative (explanatory) purposes only.

In a particular embodiment, a read/write head of a storage device is loaded (or moved) over the storage medium 302 in a load direction 314 and is unloaded (or moved) to a secured (parked) position at the detent portion 312 of the ramp mechanism 304 in an unload direction 316 that is opposite to the load direction 314. In a particular example, a controller of a storage device is adapted to increase a spindle speed and an associated rotational velocity associated with the storage medium 302 during an unload operation. During the unload operation, a read/write head of the storage device is moved from a track location over the storage medium 302 to the detent portion 312 of the ramp mechanism 304, after the spindle speed and the association rotational velocity are increased to the desired spindle speed, which can be a relatively high spindle speed as compared to a nominal spindle speed.

Figure 4:
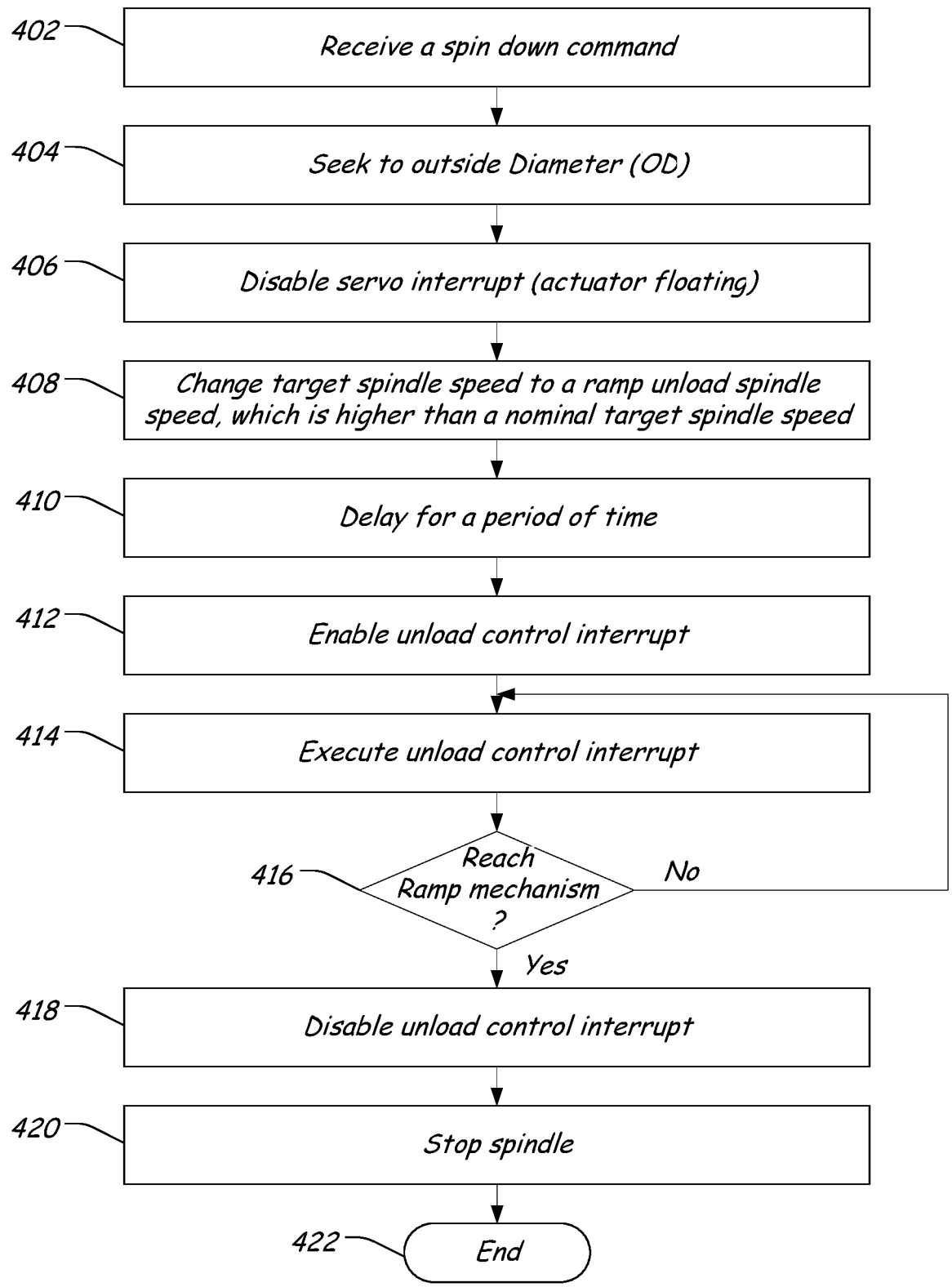
FIG. 4 is a flow diagram of a particular illustrative embodiment of a method of varying a spindle speed during ramp unload operations.

FIG. 4 is a flow diagram of a particular illustrative embodiment of a method of varying a spindle speed during ramp unload operations. At 402, a spin down command is received. Advancing to 404, a seek operation is performed to move the read/write head, such as to a track location near the outside diameter. Moving to 406, the controller disables a servo interrupt, which leaves the actuator circuit holding at the particular track location. Continuing to 408, a target spindle speed is changed to a ramp unload spindle speed, which is higher than a nominal target spindle speed. Proceeding to 410, the controller delays for a period of time, such as 10 milliseconds, to allow time for the spindle to accelerate to the target spindle speed. Advancing to 412, the controller enables an unload control interrupt. Continuing to 414, the unload control interrupt is executed by the controller.

Moving to 416, if a load/unload ramp mechanism is not reached, the method returns to 414 and the unload control interrupt is executed. At 416, if the load/unload ramp mechanism is reached, the method advances to 418 and the unload control interrupt is disabled. Proceeding to 420, the controller stops the spindle. The method terminates at 422.

Figure 5:
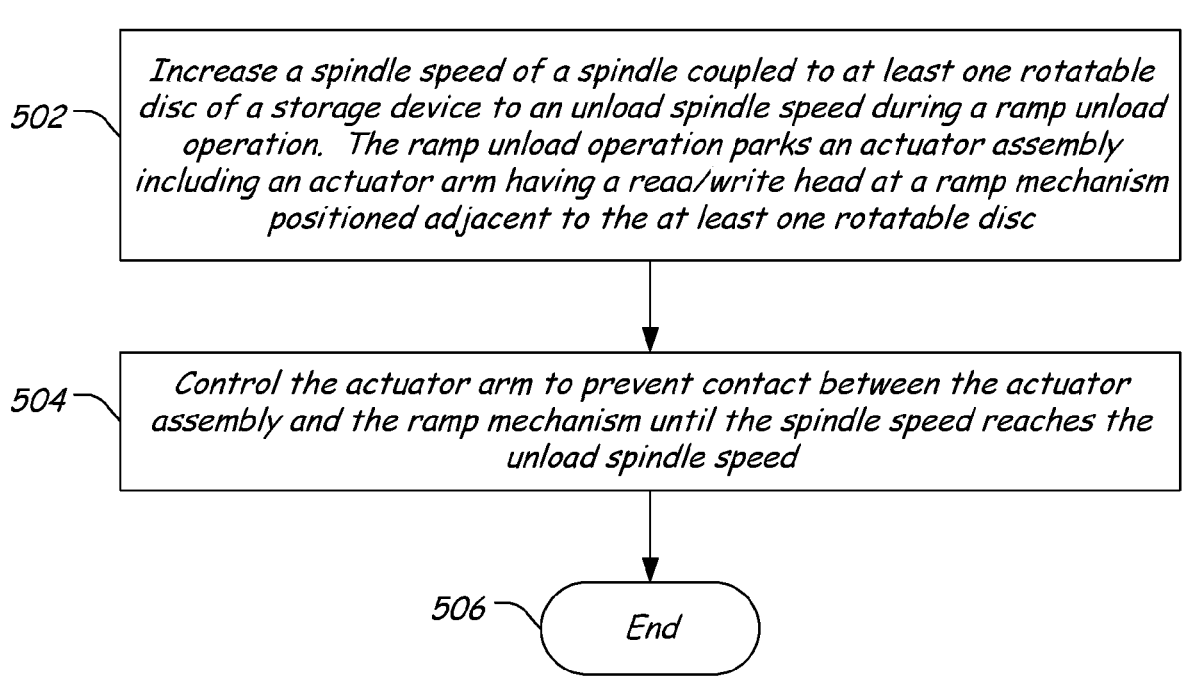
FIG. 5 is a flow diagram of a second particular illustrative embodiment of a method of varying a spindle speed during ramp unload operations.

FIG. 5 is a flow diagram of a second particular illustrative embodiment of a method of varying a spindle speed during ramp unload operations. At 502, a spindle speed of a spindle coupled to at least one rotatable disc of a storage device is increased to an unload spindle speed during a ramp unload operation, where the ramp unload operation parks an actuator assembly including an actuator arm having a read/write head at a ramp mechanism positioned adjacent to the at least one rotatable disc. Moving to 504, the actuator arm is controlled to prevent contact between the actuator assembly and the ramp mechanism until the spindle speed reaches the unload spindle speed. In a particular embodiment, the actuator arm is controlled via the voice coil motor (VCM). The method terminates at 506.

In a particular embodiment, the method further includes positioning the read/write head relative to a storage track of the one or more rotatable discs while increasing the spindle speed (or rotational velocity of the at least one rotatable disc). In another particular embodiment, the method includes holding the read/write head at the storage track until the spindle speed of the spindle and the associated rotational velocity of the one or more rotatable discs reaches the unload spindle speed and/or the associated unload rotational velocity. In a particular example, movement of the read/write head may be delayed for a pre-determined time period, which may be programmed by a manufacturer, by the control circuitry based on performance parameters associated with the storage device, or any combination thereof. In still another particular embodiment, the storage track is selected to position the read/write head for each unload operation, such that a movement time associated with movement of the read/write head from the selected storage track to the ramp mechanism comprises a substantially constant unload time. In a particular example, the storage device may be configured to position the read/write head at a particular storage track that is adjacent to a middle portion of the storage media, an inner diameter portion of the storage media, an outer diameter portion of the storage media, or a particular selected track. In a particular example, each time the read/write head is unloaded, the read/write head is positioned relative to the particular storage track until a spindle speed of the spindle reaches an unload spindle speed. By positioning the read/write head at the particular storage track, the distance traveled by the read/write head from the storage track to the ramp mechanism can be constant, and the associated movement time can also be relatively constant.

Figure 6:
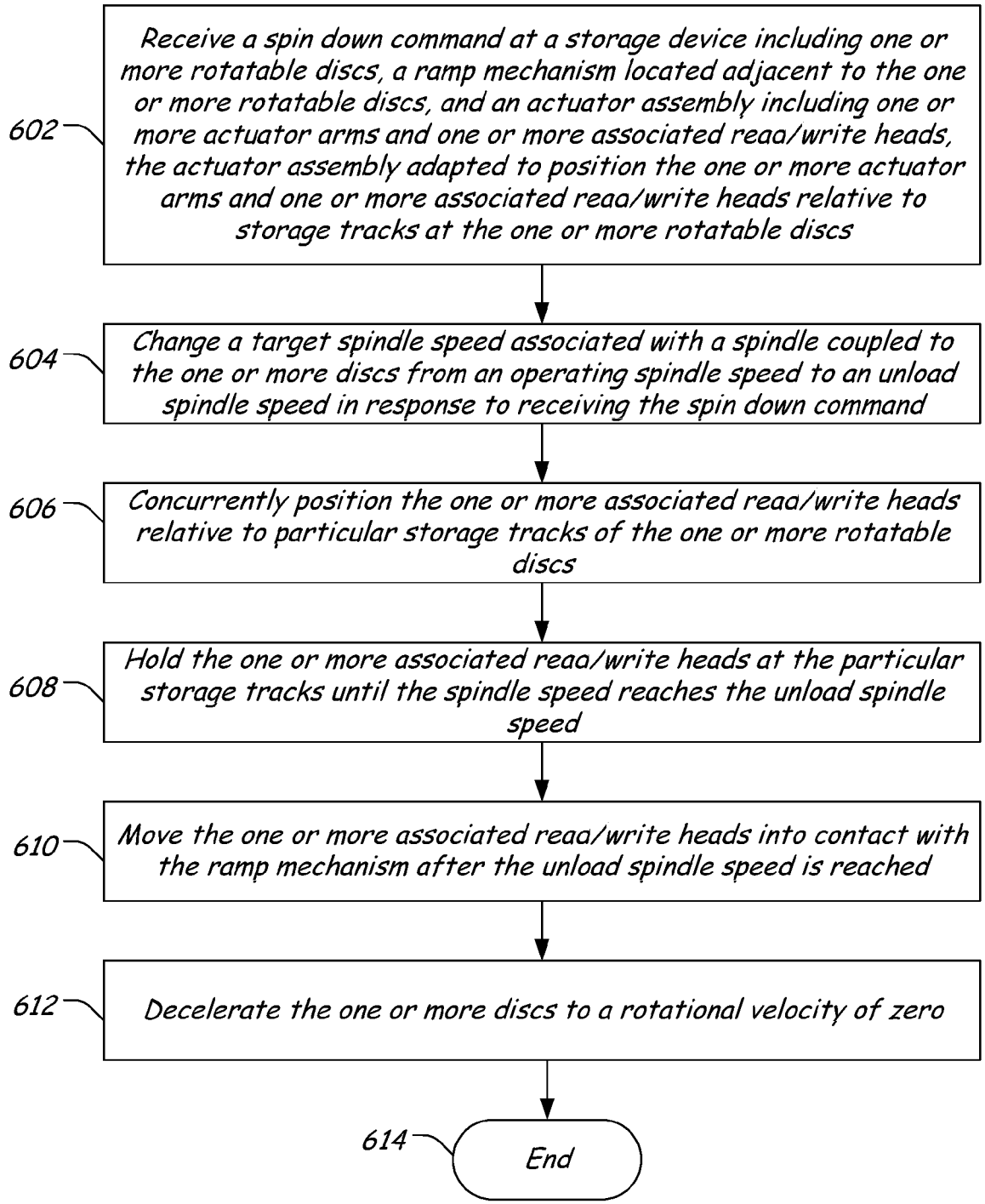
FIG. 6 is a flow diagram of a particular illustrative embodiment of a method of varying a spindle speed during ramp unload operations.

FIG. 6 is a flow diagram of a particular illustrative embodiment of a method of varying a spindle speed during ramp unload operations. At 602, a spin down command is received at a storage device that includes one or more rotatable discs, a ramp mechanism located adjacent to an outside diameter of the one or more rotatable discs, and an actuator assembly having one or more actuator arms and one or more associated read/write heads, where the actuator assembly is adapted to position the one or more actuator arms and one or more associated read/write heads relative to storage tracks at the one or more rotatable discs. Advancing to 604, a target spindle speed associated with a spindle coupled to the one or more discs is changed from an operating spindle speed to an unload spindle speed in response to receiving the spin down command. Continuing to 606, the one or more associated read/write heads are positioned concurrently relative to particular storage tracks of the one or more rotatable discs. In a particular example, the one or more associated read/write heads are positioned as the spindle speed and the associated rotational velocity of the one or more discs increases. Proceeding to 608, the one or more associated read/write heads are held at the particular storage tracks until the spindle speed reaches the unload spindle speed. Moving to 610, the one or more associated read/write heads are moved into contact with the ramp mechanism after the unload spindle speed is reached. Advancing to 612, the one or more discs are decelerated to a rotational velocity of zero. The method terminates at 614.

In general, the method described with respect to FIGS. 4-6 can be varied, depending on the particular implementation. In a particular example, blocks 604 and 606 can be performed sequentially and in another order, such that the associated read/write heads are positioned relative to particular storage tracks before the target spindle speed is increased. Further, the particular order of the blocks may be varied, or other blocks may be inserted without departing from the scope and spirit of the disclosure.

Figure 7:
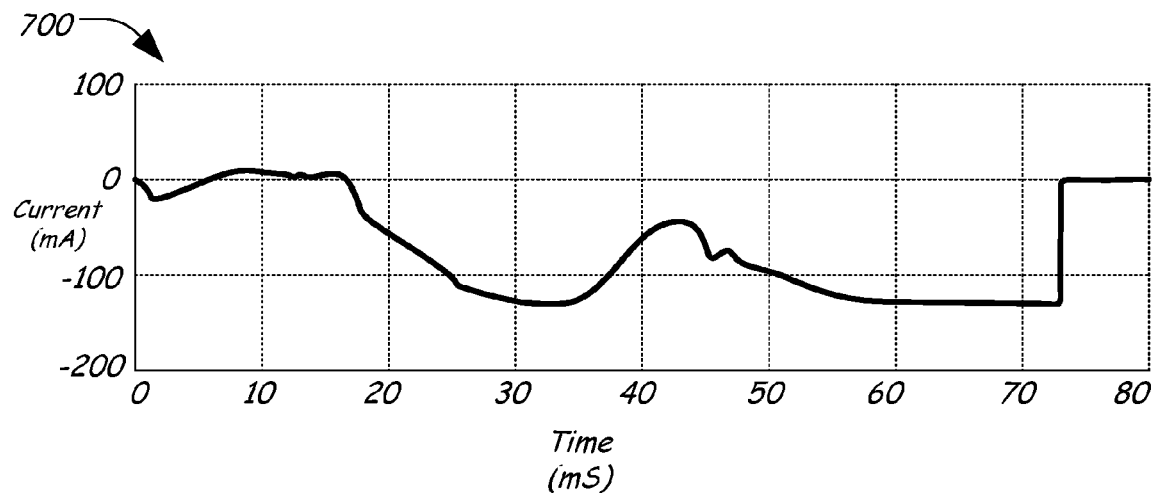
FIG. 7 is a graph of a particular illustrative embodiment of voice coil motor (VCM) current in milliamps versus time in milliseconds illustrating VCM current behavior of a particular small form factor storage device with spindle speed dip during a ramp unload operation.

FIG. 7 is a graph 700 of a particular illustrative embodiment of VCM current in milliamps versus time in milliseconds illustrating the VCM current behavior of a particular small form factor storage device with spindle speed dip during ramp unload operation operating at a nominal spindle speed of approximately 3600 revolutions per minute (RPM). Prior to time zero (0) in the graph 700, the controller positioned the read/write head at a desired track of the storage media. The read/write head reaches the ramp mechanism contact at approximately 18 milliseconds, and the VCM current approaches zero milliamps (mA). However, at 19 milliseconds, the current level changes away from zero mA until about 72 milliseconds, when the read/write head reaches the detent portion of the ramp mechanism. The VCM peak current reaches a maximum of about −138 milliamps even though the read/write head finally climbs up the ramp slope successfully.

Figure 8:
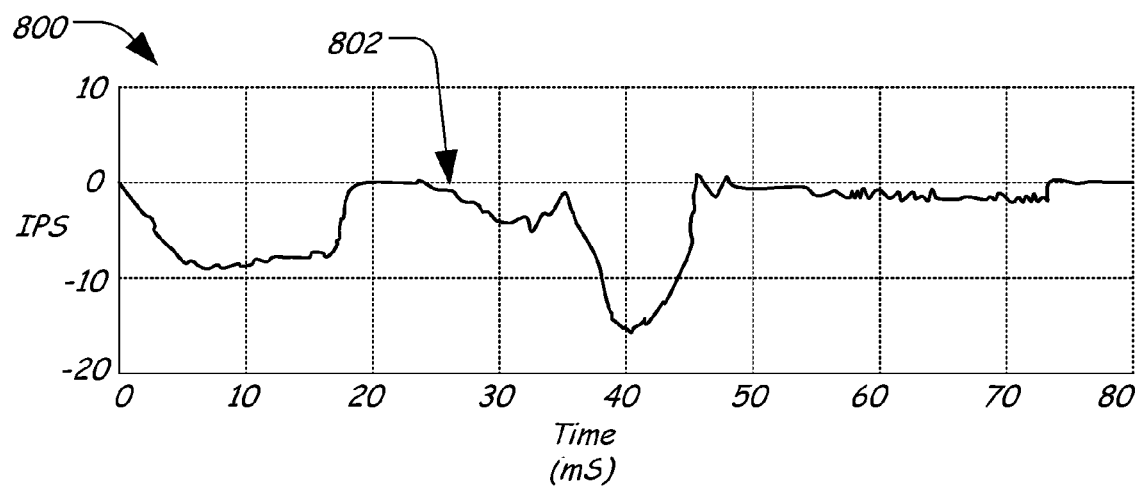
FIG. 8 is a graph of a particular illustrative embodiment of read/write head velocity in inches per second (IPS) versus time in milliseconds illustrating read/write head velocity behavior of a particular small form factor storage device with spindle speed dip during a ramp unload operation.

FIG. 8 is a graph 800 of a particular illustrative embodiment of read/write head velocity in inches per second (IPS) versus time in milliseconds illustrating read/write velocity behavior of a particular small form factor storage device with spindle speed dip during a ramp unload operation. As in FIG. 7, the read/write head reaches the ramp mechanism contact at approximately 18 milliseconds, where the velocity of the read/write head approaches zero inches per second. Spindle dip is illustrated at 802 after the read/write head dwells at the ramp contact for about 10 milliseconds due to a drag force of suction and stiction during the unload operation. The read/write head finally approaches a velocity of approximately zero IPS at about 46 milliseconds and fluctuates until about 73 milliseconds before stabilizing at zero IPS.

Figure 9:
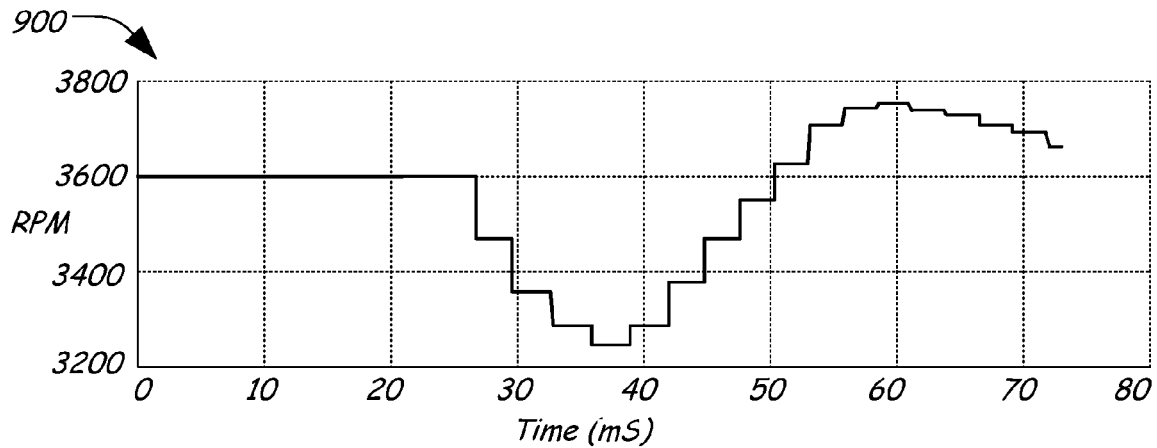
FIG. 9 is a graph of a particular illustrative embodiment of spindle speed in revolutions per minute (RPM) versus time in milliseconds illustrating spindle speed behavior of a particular small form factor storage device with spindle dip during a ramp unload operation.

FIG. 9 is a graph 900 of a particular illustrative embodiment of spindle speed in revolutions per minute (RPM) versus time in milliseconds illustrating behavior of a particular small form factor storage device with spindle speed dip during a ramp unload operation. As the spindle speed dip occurs at approximately 28 milliseconds, the revolutions per minute (RPM) of the spindle (and the associated storage media) decreases in steps to a reduced RPM of the storage media of about 3250 RPM from a nominal RPM of approximately 3600. At about 39 milliseconds, the RPM of the spindle (and the associated storage media) increases with some overshoot to almost 3750 RPM before the spindle speed falls off.

Figure 10:
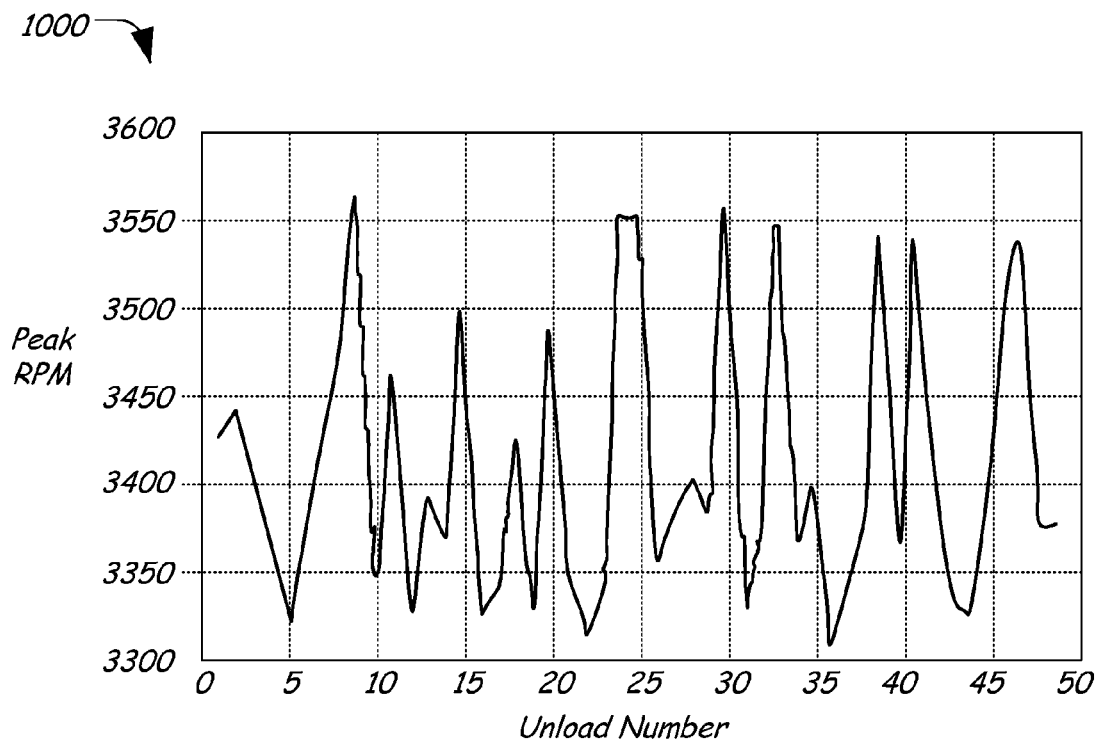
FIG. 10 is a graph of a particular illustrative embodiment of minimum spindle speed in revolutions per minute (RPM) during each unload operation illustrating spindle speed dip at each unload operation at 3600 RPM.

FIG. 10 is a graph 1000 of a particular illustrative embodiment of minimum spindle speed in revolutions per minute (RPM) during each unload operation illustrating a spindle speed dip at each unload operation at 3600 RPM. The graph 1000 illustrates minimum spindle speed variation for multiple unload operations. The graph 1000 has a mean spindle speed dip of approximately 169 RPM.

Figure 11:
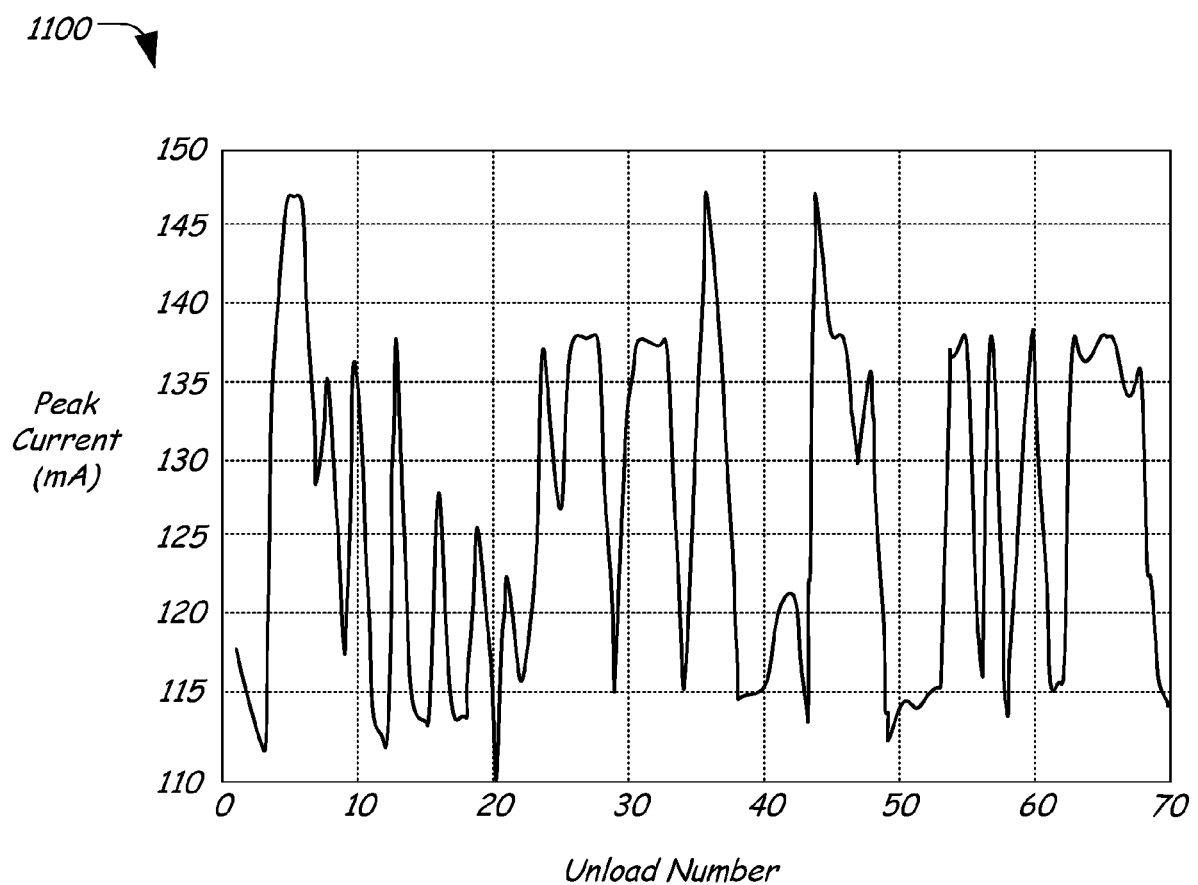
FIG. 11 is a graph of a particular illustrative embodiment of peak VCM current in milliamps during each ramp unload operation illustrating VCM current variation at 3600 RPM.

FIG. 11 is a graph 1100 of a particular illustrative embodiment of peak VCM current in milliamps during each ramp unload operation illustrating VCM current variation in a particular storage device operating at 3600 RPM. As shown, during the ramp unload operations, the peak VCM current varies from a low of approximately 112 mA to peak currents of approximately 147 mA, with a mean peak current of approximately 128 mA.

Figure 12:
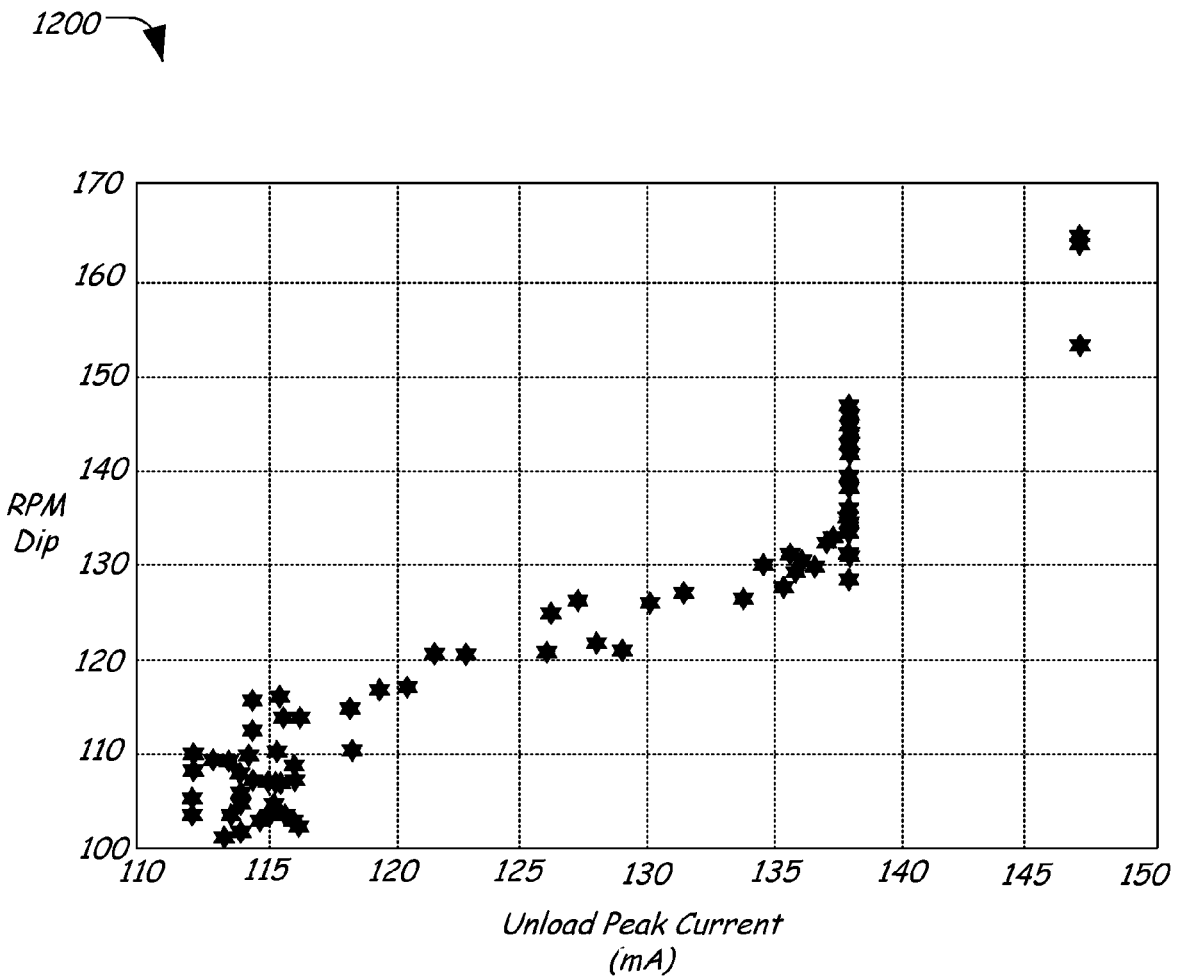
FIG. 12 is a graph of a particular illustrative embodiment of spindle speed dip in revolutions per minute (RPM) versus unload peak current in milliamps illustrating correlations between the spindle speed dip and the unload peak VCM current.

FIG. 12 is a graph 1200 of a particular illustrative embodiment of spindle speed dip in revolution per minute (RPM) versus unload VCM peak current in milliamps illustrating correlations between the spindle speed dip and the unload peak VCM current for a particular storage device operating at 3600 RPM. As shown, there is a cluster of revolutions per minute (RPM) dip incidents representing spindle speed dip of approximately 100 to 120 RPM at lower unload peak VCM currents of 112 mA to 117 mA. The graph 1200 also illustrates a second cluster of RPM dip incidents representing spindle speed dip of approximately 129 RPM to 149 RPM at unload peak VCM currents ranging from 135 mA to 138 mA.

In general, from FIGS. 7-12, it can be seen that higher spindle speed dip incidents correlate to higher unload peak VCM currents. In extreme cases, such spindle speed dip can result in a spindle down on the data zone (SDOD) incident, which may lead to particle, media, and/or read/write head damage. In a particular example, the unload peak VCM current increases due to a large drag force during the ramp unload operation. While the head-bearing sliders are designed to avoid head/media damage, manufacturing can introduce deviations from nominal conditions. Such deviations can be related to any number of manufacturing parameters, including a pitch static angle and a roll static angle associated with the slider design.

As will be seen by reviewing the graphs of FIGS. 13-17 below and by reviewing the table illustrated in FIG. 18, increasing the rotational velocity of the spindle and thus of the disc pack during ramp unload operations can improve airflow at the extreme outer diameter of the disc pack, reducing spindle speed dip and reducing peak unload VCM currents. By implication, since the peak unload VCM currents are attributable, in part, to the large drag force during unload, the increased spindle speed at unload also reduces the drag force on the read/write head during the unload operation.

Figure 13:
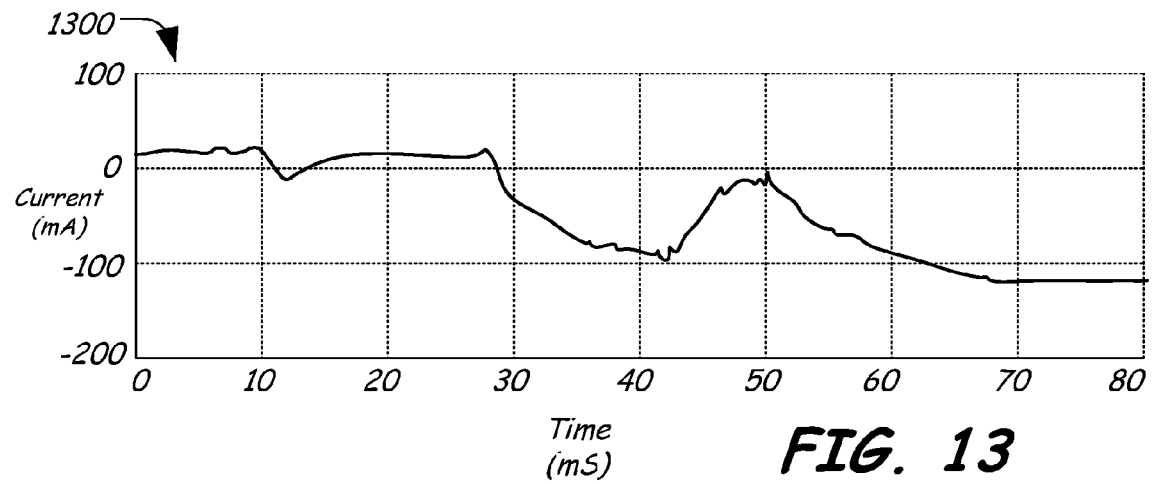
FIG. 13 is a graph of a particular illustrative embodiment of VCM current in milliamps versus time in milliseconds illustrating VCM current behavior during ramp unload operation of a storage device including logic to control a variable spindle speed for ramp unload operations.

FIG. 13 is a graph 1300 of a particular illustrative embodiment of current in milliamps versus time in milliseconds illustrating VCM current behavior of a particular storage device including logic to control a variable spindle speed for ramp unload operations. In this particular example, the controller positioned the read/write head at a selected track of the storage media prior to initiation of the ramp unload operation (i.e., prior to time zero (0) in the graph 1300). At time zero, the target spindle speed is changed to 4200 revolutions per minute (RPM). After a delay of approximately 10 milliseconds, the read/write head starts to move from the selected storage track to the ramp mechanism under the control of the control circuitry, which includes a ramp load/unload feedback control system. The spindle speed reaches the target spindle speed when or before the read/write head reaches the ramp contact, which may be at the slope portion of the ramp mechanism, such as the slope portion 308 illustrated in FIG. 3. In this example, the peak unload VCM current is reduced to approximately 112 mA.

Figure 14:
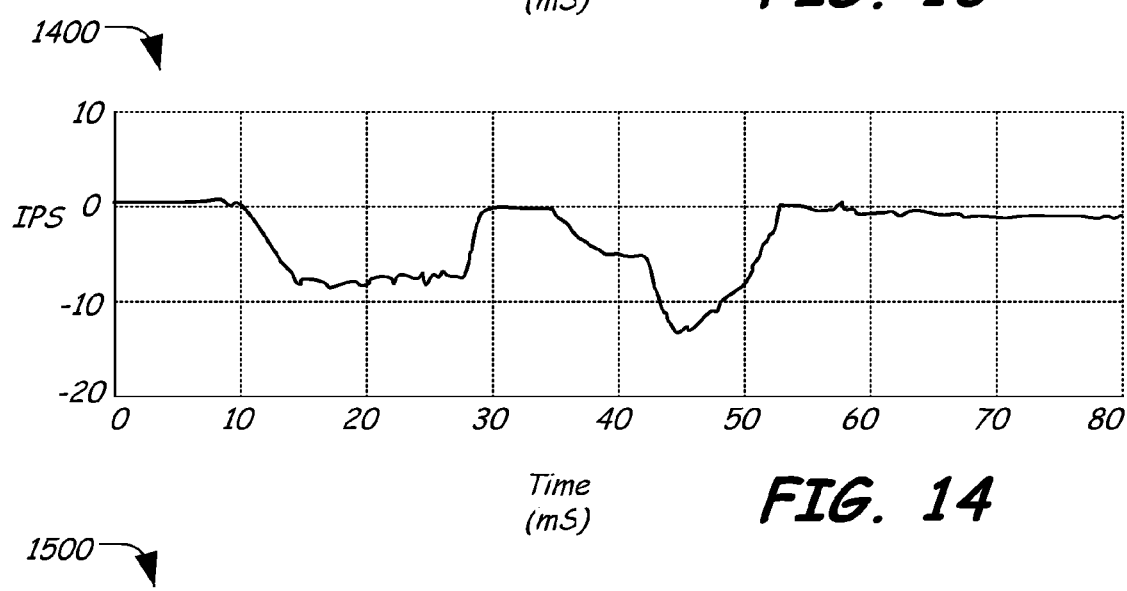
FIG. 14 is a graph of a particular illustrative embodiment of velocity in inches per second versus time in milliseconds illustrating the read/write head velocity behavior during ramp unload operation of a storage device including logic to control a variable spindle speed for ramp unload operations.

FIG. 14 is a graph 1400 of a particular illustrative embodiment of velocity in inches per second (IPS) versus time in milliseconds illustrating read/write head velocity behavior of a particular storage device including logic to control a variable spindle speed for ramp unload operations. The graph 1400 corresponds to the graph 1300, such that the spindle stops moving from approximately time zero (0) for about 10 milliseconds, and then moves from the storage track to the ramp mechanism, contacting the ramp mechanism when or after the target spindle speed of 4200 RPM is reached. The graph 1400 illustrates that the head moves at a relatively constant velocity from about 14 milliseconds until about 28 milliseconds, and comes to a stop at about 29 milliseconds (at contact with the ramp mechanism). The read/write head is then moved up the ramp from about 35 milliseconds to about 52 milliseconds, where the read/write head settles into a detent portion of the ramp mechanism (such as the detent portion 312 of the ramp mechanism 304 illustrated in FIG. 3).

Figure 15:
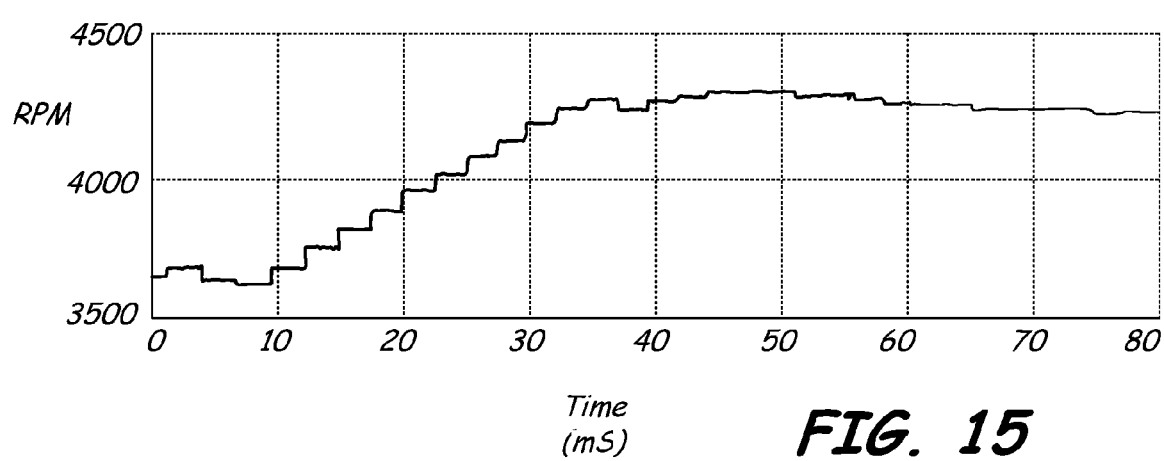
FIG. 15 is a graph of a particular illustrative embodiment of spindle speed in revolutions per minute (RPM) versus time in milliseconds illustrating the spindle speed behavior during ramp unload operation of a storage device including logic to control a variable spindle speed for unload operations.

FIG. 15 is a graph 1500 of a particular illustrative embodiment of spindle speed in revolutions per minute (RPM) versus time in milliseconds illustrating spindle speed behavior of a particular storage device including logic to control a variable spindle speed for ramp unload operations. As can be seen by the graph 1500, there is no spindle speed dip at ramp contact at approximately 29 milliseconds. In general, the spindle speed dip is eliminated at ramp contact because the high spindle speed improves the airflow, making it more stable even at the extreme outer diameter of the disc pack. The more stable airflow improves the fly-ability of the read/write head even though the ramp contact is moved to the extreme outside diameter of the disc pack to increase available data storage real estate.

Figure 16:
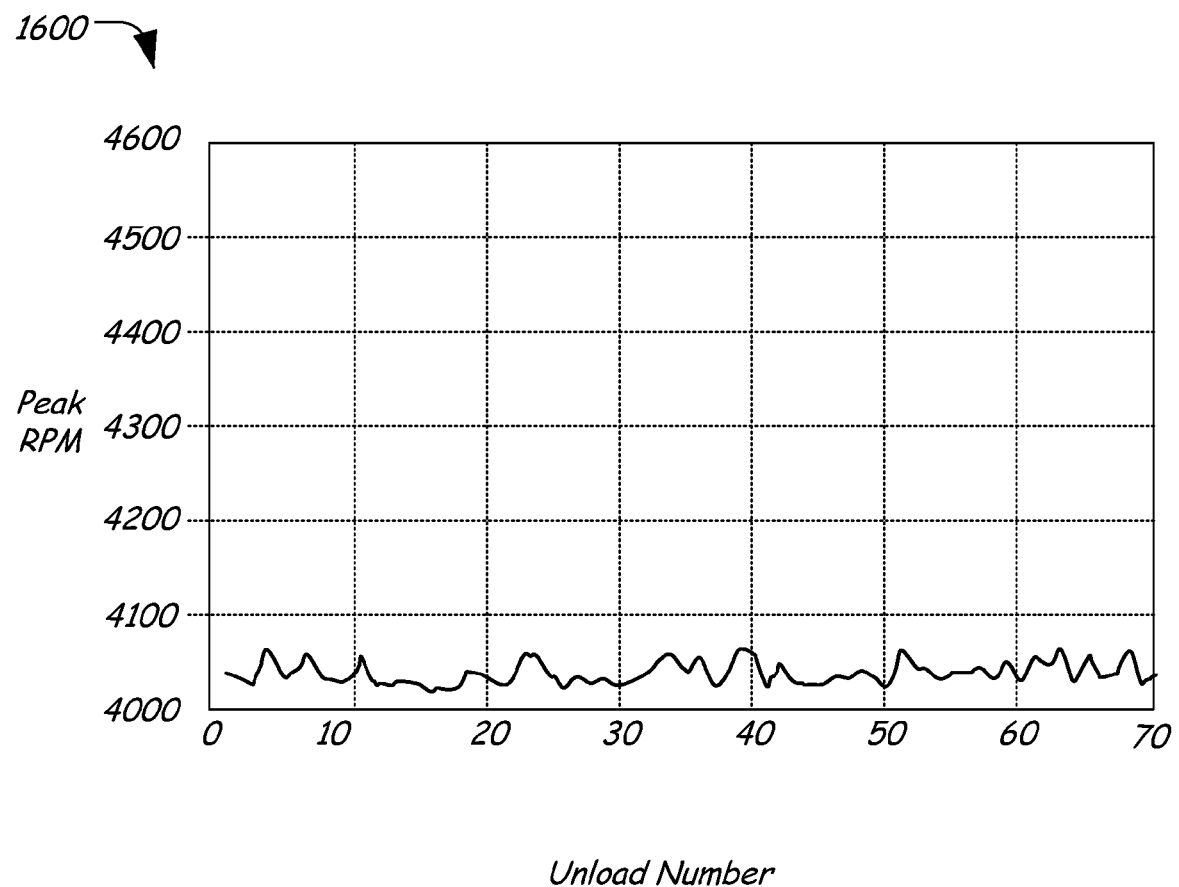
FIG. 16 is a graph of a particular illustrative embodiment of the peak spindle speed in revolutions per minute (RPM) during each ramp unload operation for a storage device having logic to control a variable spindle speed for ramp unload operations, where the spindle is operating at 4000 RPM.

FIG. 16 is a graph 1600 of a particular illustrative embodiment of peak spindle speed in revolutions per minute (RPM) during each ramp unload operation for a particular storage device having logic to control a variable spindle speed for ramp unload operations, where the target spindle speed is at 4000 RPM. In general, the graph 1600 illustrates a minimum spindle speed during each ramp unload operation for a device that has a target unload spindle speed of 4000 RPM. As shown, the minimum spindle speed is above the 4000 RPM target. In this example, the graph 1600 illustrates that the spindle speed has reduced variation during unload operations relative to the graph 1000 of the particular storage device at 3600 RPM illustrated in FIG. 10.

Figure 17:
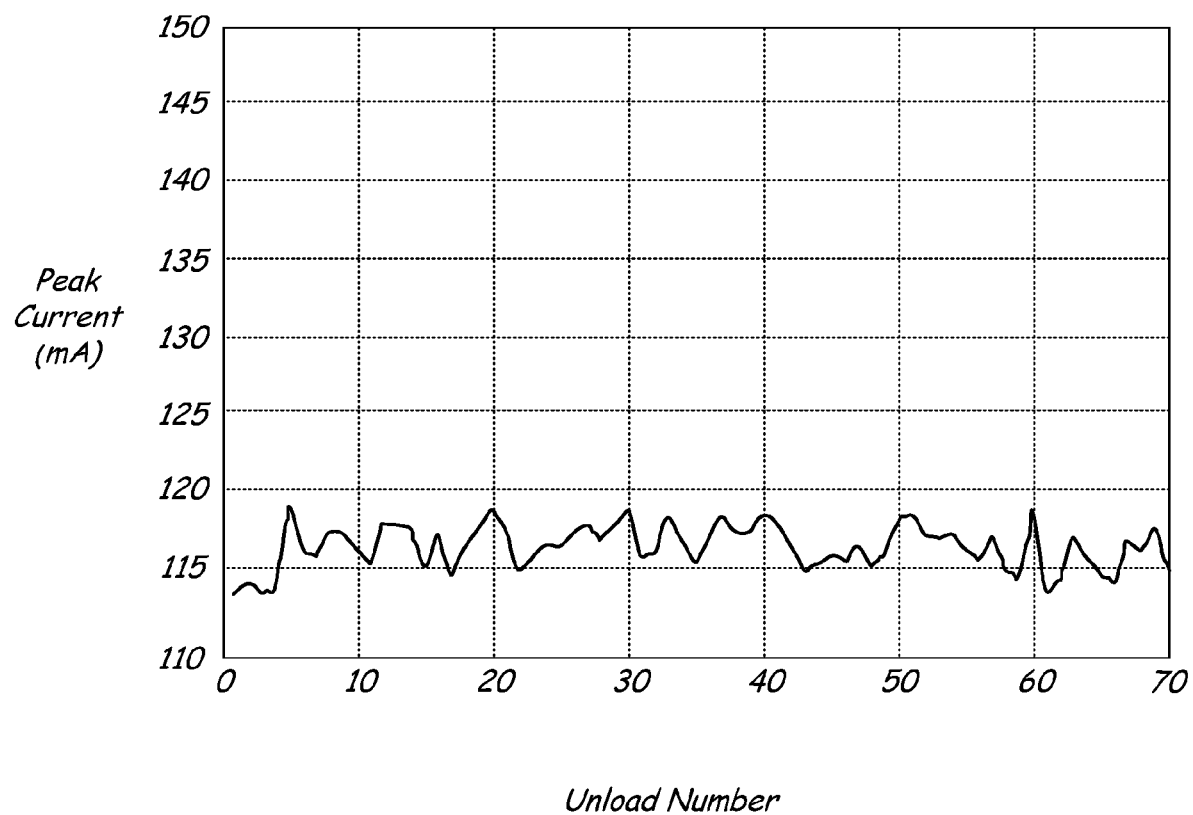
FIG. 17 is a graph of a particular illustrative embodiment of peak VCM current in milliamps during each ramp unload operation for a storage device having logic to control a variable spindle speed for ramp unload operations, where the spindle is operating at 4000 RPM.

FIG. 17 is a graph 1700 of a particular illustrative embodiment of peak VCM current in milliamps during each ramp unload operation for a storage device having logic to control a variable spindle speed for ramp unload operations, where the spindle is operating at 4000 RPM. The graph 1700 illustrates the unload peak VCM current has a reduced variation during each ramp unload operation as compared to the graph 1100 of a particular storage device at 3600 RPM illustrated in FIG. 11.

In a particular example, the increased spindle speed improves fly-ability at the outer diameter of the disc pack, which eliminates spin dip at ramp contact and reduces variations in peak current and peak spindle speed. As a result, the unload operations of the read/write head at high spindle speeds are less likely to cause head/media damage.

FIG. 18 is a particular illustrative embodiment of a table 1800 illustrating peak unload VCM current test results for multiple storage devices performing a ramp unload operation at a normal spindle speed of a conventional device and at 4200 RPM according to the systems and methods described above with respect to FIGS. 1-6 and 13-17. In general, the table 1800 illustrates that the unload peak VCM current is decreased even in storage devices that otherwise have no spindle speed dip, such as storage devices 5 and 10 in the table 1800. In a particular embodiment, the unload peak VCM current is reduced even in such storage devices because the suction and stiction force at ramp contact during ramp unload operation with high spindle speed is lower than that with normal spindle speed. Overall, the table 1800 illustrates that the unload peak VCM current is reduced by an average of 7.5 mA.

In general, by increasing the spindle speed during the unload operation, the ramp contact can be moved to an extreme outside diameter of the disc pack. In a particular example, real estate of 1280 storage tracks can be obtained in a low profile storage device without spindle speed dip over data incidents. Further, the increased spindle speed during ramp unload operations significantly reduces the possibility of media scratch failure caused by particles. In another particular example, the unload peak VCM current is decreased by an average of 7.5 milliamps (mA) due to reduced suction and stiction at ramp contact during the unload operation.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage system while maintaining substantially the same functionality without departing from the scope and spirit of the present invention.

What is claimed is:

1. A device comprising a controller adapted to control a spindle motor that controls rotation of at least one rotatable disc of a storage device, the controller adapted to:
   disable a servo interrupt;
   increase a spindle speed associated with the spindle motor to an unload spindle speed that is greater than an operating spindle speed;
   delay movement of a read/write mechanism for a period of time;
   enable an unload control interrupt;
   initiate movement of the read/write mechanism to contact a ramp mechanism; and
   disable the unload control interrupt prior to stopping the spindle motor.

2. The controller of claim 1, wherein the controller is adapted to control an actuator assembly to delay contact between a read/write mechanism and a ramp mechanism adjacent to the at least one rotatable disc until the spindle speed reaches the unload spindle speed.

3. The controller of claim 1, wherein the controller is adapted to receive a spin down command before increasing the spindle speed.

4. The controller of claim 1, wherein the controller is adapted to position the read/write mechanism at an inner diameter track that is spaced closer to an inside edge of the at least one rotatable disc than an outside edge, the positioning occurring concurrently with increasing the spindle speed.

5. The controller of claim 4, wherein a moving time associated with the read/write mechanism to a ramp mechanism adjacent to the outside edge of the at least one rotatable disc during ramp unload operations represents a fixed time interval for each ramp unload operation.

6. A storage device comprising:
   at least one rotatable disc adapted to store data;
   a spindle motor coupled to a spindle adapted to rotate the at least one rotatable disc at variable speeds;
   an actuator assembly including an actuator arm adapted to pivot relative to the at least one rotatable disc, the actuator assembly including a read/write head for reading and writing data from and to the at least one rotatable disc;
   a load/unload ramp mechanism positioned adjacent to the at least one rotatable disc and adapted to receive the actuator arm in an unloaded position; and
   a controller adapted to:
      disable a servo interrupt;
      increase a spindle speed associated with the spindle motor to an unload spindle speed that is greater than an operating spindle speed;
      delay movement of a read/write mechanism for a period of time;
      enable an unload control interrupt to initiate movement of the read/write mechanism to contact a ramp mechanism;
      move the read/write mechanism to contact the ramp mechanism; and
      disable the unload control interrupt when the read/write mechanism has contacted the ramp mechanism.

7. The storage device of claim 6, wherein the controller is adapted to delay contact between the actuator assembly and the load/unload ramp mechanism until the spindle speed reaches the unload spindle speed.

8. The storage device of claim 6, wherein the load/unload ramp includes a ramp detent portion to secure the actuator arm when a ramp unload operation is complete.

9. The storage device of claim 8, wherein the controller is adapted to turn off the spindle motor after the actuator arm is secured.

10. The storage device of claim 6, further comprising a solid-state memory to store operating instructions executable by the controller to control the variable speeds and to control operation of the actuator assembly.

11. The storage device of claim 6, wherein the controller is adapted to position the read/write head at a particular storage track of the at least one rotatable disc until the spindle speed reaches the unload spindle speed.

12. The storage device of claim 6, further comprising an auxiliary power source coupled to a spindle control circuit and adapted to provide operating power to the spindle motor to increase the spindle speed to the unload spindle speed when power is lost.

13. The storage device of claim 6, further comprising an interface responsive to a host system, the interface coupled to the controller, wherein the controller is responsive to a command received via the interface to initiate the unload operation.

14. A method comprising:
   disabling a servo interrupt;
   increasing a spindle speed of a spindle coupled to at least one rotatable disc of a storage device to an unload spindle speed that is greater than a nominal speed, the storage device including an actuator arm having a head and a ramp mechanism positioned adjacent to the at least one rotatable disc; and
   controlling the actuator arm to prevent contact between the head and the ramp mechanism until the spindle speed reaches the unload spindle speed; and
   enabling an unload control interrupt to initiate movement of the head to contact the ramp mechanism when the spindle speed reaches the unload spindle speed;
   moving the actuator arm to cause the head to contact the ramp mechanism; and
   disabling the unload control interrupt when the read/write mechanism has contacted the ramp mechanism.

15. The method of claim 14, wherein increasing the spindle speed comprises controlling the spindle motor via a controller adapted to increase the spindle speed associated with the spindle to the unload spindle speed during the ramp unload operation.

16. The method of claim 14, further comprising positioning the head relative to a storage track within an inner half of a diameter of the at least one rotatable disc while increasing the spindle speed.

17. The method of claim 16, further comprising holding the head at the storage track until the spindle speed reaches the unload spindle speed.

18. The method of claim 16, further comprising selecting the storage track to position the head for each unload operation, wherein a movement time associated with movement of the head from the selected storage track to the ramp mechanism comprises a substantially constant unload time.

19. The method of claim 14, wherein the unload spindle speed is greater than or equal to 4000 revolutions per minute (RPM).

20. The method of claim 14, further comprising delaying for a pre-determined period of time before moving the actuator arm from a storage track of the one or more rotatable discs to contact the ramp mechanism.

* * * * *